(12) United States Patent
Takaura

(10) Patent No.: US 12,560,820 B2
(45) Date of Patent: Feb. 24, 2026

(54) OPTICAL IMAGE STABILIZATION UNIT CAPABLE OF BEING MINIATURIZED, LENS BARREL, AND OPTICAL APPARATUS

(71) Applicant: CANON KABUSHIKI KAISHA, Tokyo (JP)

(72) Inventor: Akira Takaura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 328 days.

(21) Appl. No.: 18/357,323

(22) Filed: Jul. 24, 2023

(65) Prior Publication Data

US 2024/0036346 A1 Feb. 1, 2024

(30) Foreign Application Priority Data

Jul. 28, 2022 (JP) ................................. 2022-120684

(51) Int. Cl.
| *G02B 27/64* | (2006.01) |
| *G02B 7/02* | (2021.01) |
| *H04N 23/54* | (2023.01) |
| *H04N 23/68* | (2023.01) |

(52) U.S. Cl.
CPC ............. *G02B 27/646* (2013.01); *G02B 7/02* (2013.01); *H04N 23/54* (2023.01); *H04N 23/687* (2023.01)

(58) Field of Classification Search
CPC ...... G02B 7/102; G02B 27/646; G02B 7/022; G02B 7/023
See application file for complete search history.

(56) References Cited

U.S. PATENT DOCUMENTS

| 7,661,893 | B2 * | 2/2010 | Kureishi | .................. G02B 7/10 |
| | | | | 396/505 |
| 2009/0324210 | A1 * | 12/2009 | Kakuta | ........................... 396/72 |
| 2015/0229843 | A1 * | 8/2015 | Shimizu | ............. H04N 23/6812 |
| | | | | 348/222.1 |
| 2017/0280036 | A1 * | 9/2017 | Morinaga | .............. H04N 23/54 |

FOREIGN PATENT DOCUMENTS

JP      2015-034915 A      2/2015

OTHER PUBLICATIONS

JP2017106950A Lens Barrel and Optical Instrument. Sasaki Kunihiko Jun. 15, 2017 (Year: 2015).*

* cited by examiner

*Primary Examiner* — Van N Chow
(74) *Attorney, Agent, or Firm* — Cowan, Liebowitz & Latman, P.C.

(57) ABSTRACT

An optical image stabilization unit capable of being miniaturized is provided. The optical image stabilization unit includes a fixed member, a lens, a movable member that holds the lens and is movable on a plane, which is substantially perpendicular to an optical axis direction, in the fixed member, a position detection sensor held by the movable member, and a flexible printed wiring board. The flexible printed wiring board includes a fixed side holding portion that is fixed to the fixed member, a movable side holding portion that is fixed to the movable member, a bending portion that connects the fixed side holding portion and the movable side holding portion, and a sensor mounting portion, on which the position detection sensor is mounted. When the flexible printed wiring board is viewed from the optical axis direction, the bending portion and the sensor mounting portion are disposed to overlap each other.

13 Claims, 11 Drawing Sheets

OPTICAL IMAGE STABILIZATION UNIT CAPABLE OF BEING MINIATURIZED, LENS BARREL, AND OPTICAL APPARATUS

BACKGROUND OF THE INVENTION

Field of the Invention

The present invention relates to an optical image stabilization unit, a lens barrel, and an optical apparatus.

Description of the Related Art

Conventionally, in order to prevent an image blur due to a camera shake or the like that tends to occur during hand-held photographing, various kinds of lens barrels and optical apparatuses having an optical image stabilization unit have been proposed (for example, see Japanese Laid-Open Patent Publication (kokai) No. 2015-34915). The optical image stabilization unit realizes camera shake correction by detecting shake information of the optical apparatus by using a shake detecting means and optically cancelling the shake in response to the detection result obtained by the shake detecting means. In this case, a position of the optical image stabilization unit is detected, and as a detecting method of detecting the position of the optical image stabilization unit, a method of obtaining a positional relationship between a movable side and a fixed side based on detection signals by using a position detection sensor such as a Hall element and a magnet for position detection (a position detection magnet) is generally used.

Recent lens barrels are required to be small in order to improve portability and storability. However, there is a problem that a space for routing a flexible printed wiring board (a flexible printed circuit board), which is held by the optical image stabilization unit for energizing the position detection sensor, is a hindrance to miniaturization of the entire lens barrel.

SUMMARY OF THE INVENTION

The present invention provides an optical image stabilization unit which is capable of being miniaturized by eliminating waste of a space for routing a flexible printed wiring board, a lens barrel, and an optical apparatus.

Accordingly, the present invention provides an optical image stabilization unit comprising a fixed member, a lens, a movable member that holds the lens and is movable on a plane, which is substantially perpendicular to an optical axis direction, in the fixed member, a position detection sensor that is held by the movable member, and a flexible printed wiring board. The flexible printed wiring board comprises a fixed side holding portion that is fixed to the fixed member, a movable side holding portion that is fixed to the movable member, a bending portion that connects the fixed side holding portion and the movable side holding portion, and a sensor mounting portion, on which the position detection sensor is mounted. When the flexible printed wiring board is viewed from the optical axis direction, the bending portion and the sensor mounting portion are disposed to overlap each other.

According to the present invention, it is possible to realize the miniaturization by eliminating the waste of the space for routing the flexible printed wiring board.

Further features of the present invention will become apparent from the following description of exemplary embodiments with reference to the attached drawings.

DESCRIPTION OF THE EMBODIMENTS

Figure 1A:
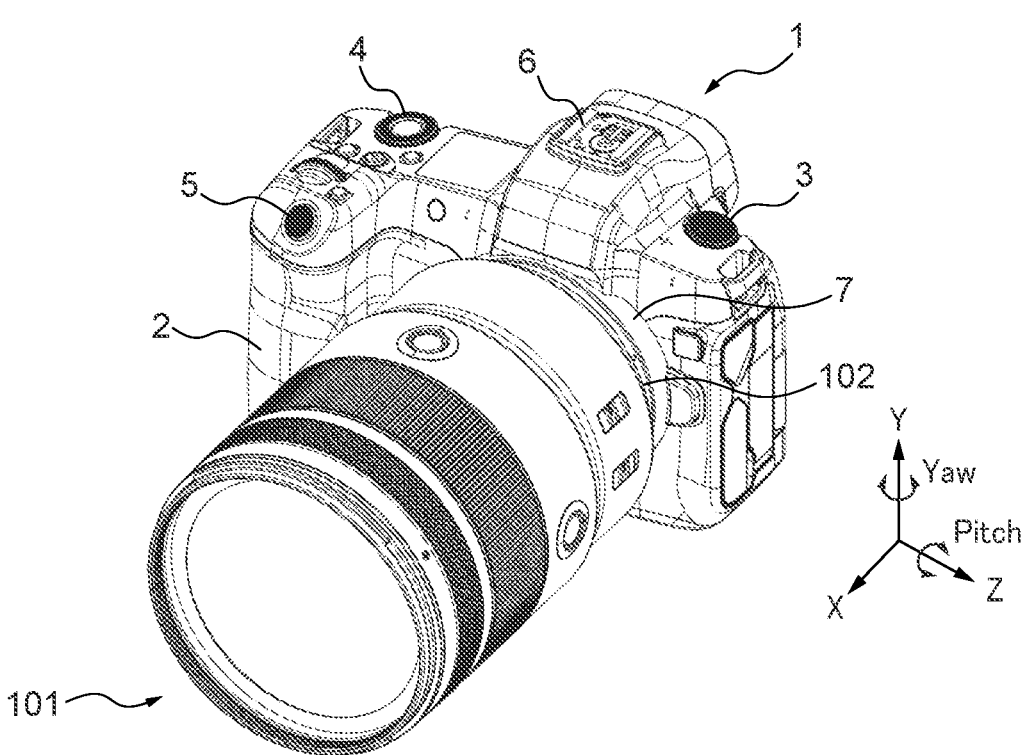
FIGS. 1A and 1B are views that show external appearances of a lens barrel and a digital camera.

The present invention will now be described in detail below with reference to the accompanying drawings showing embodiments thereof.

Hereinafter, a preferred embodiment of the present invention will be described in detail with reference to FIGS. 1A to 10. Throughout FIGS. 1A to 10, the same reference numerals indicate the same or corresponding components (parts). However, the configurations described in the preferred embodiment below are merely examples, and the scope of the present invention is not limited by the configurations described in the preferred embodiment. For example, each part (each component) that constitutes the present invention is able to be replaced with any configuration that can perform similar functions. Further, arbitrary component or constituent element may be added. Moreover, arbitrary two or more configurations (features) of the preferred embodiment is able to be combined. In the preferred embodiment, although an image stabilization group functioning as an optical image stabilization unit, a lens barrel having the image stabilization group, and a digital camera having the lens barrel will be described as optical apparatuses, various modifications and changes can be made within the scope of the gist of the present invention.

Figure 1B:
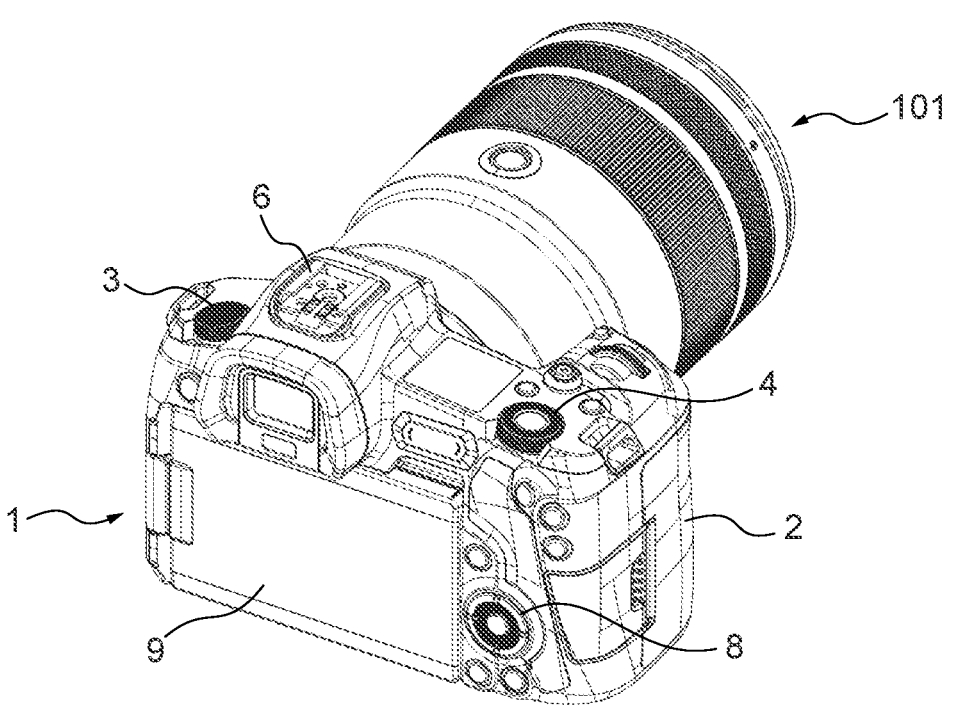

FIGS. 1A and 1B are views that show external appearances of a lens barrel 101, and a digital camera 1, to which the lens barrel 101 is detachably attached. It should be noted that the digital camera 1 is also referred to as a camera main body 1 in the following description. FIG. 1A is a perspective view that shows the front side of the lens barrel 101 and the digital camera 1, and FIG. 1B is a perspective view that shows the rear side of the lens barrel 101 and the digital camera 1. As shown in FIG. 1A, a direction, in which an optical axis of an image pickup optical system housed in the lens barrel 101 extends, is defined as an X-axis direction (an optical axis direction), and directions perpendicular to the X-axis direction (the optical axis direction) are defined as a Z-axis direction (a horizontal direction) and a Y-axis direction (a vertical direction). Hereinafter, in the case that the Z-axis direction and the Y-axis direction are collectively described, they are collectively referred to as "a Z/Y-axis direction". Further, a rotation direction around the Z-axis is defined as a pitch direction, and a rotation direction around the Y-axis is defined as a yaw direction. Furthermore, the pitch direction and the yaw direction are rotation directions around two axes, which are the Z-axis and the Y-axis that are perpendicular to each other. Hereinafter, in the case that the pitch direction and the yaw direction are collectively described, they are collectively referred to as "a pitch/yaw direction".

The camera main body 1 is provided with a grip portion 2 for a user to grip the camera main body 1 by his/her hand on a portion on the left side when viewed from the front that is the subject side (on the right side when viewed from the back). Further, a power supply operation unit 3 is provided on an upper surface portion of the camera main body 1. When the user performs an on-operation of the power supply operation unit 3 while the camera main body 1 is in a power-off state, the camera main body 1 becomes a power-on state, and image pickup (photographing) performed by the camera main body 1 becomes possible. In addition, when the user performs an off-operation of the power supply operation unit 3 while the camera main body 1 is in the power-on state, the camera main body 1 becomes the power-off state.

In addition, a mode dial 4, a release button 5, and an accessory shoe 6 are provided on the upper surface portion of the camera main body 1. It is possible to switch among a plurality of photographing modes by the user rotationally operating the mode dial 4. The plurality of photographing modes includes a manual still image photographing mode, in which the user is able to arbitrarily set photographing conditions such as a shutter speed and an aperture value, an automatic still image photographing mode, in which an appropriate exposure amount is able to be automatically obtained, a moving image photographing mode for performing moving image photographing, etc. By half-pressing the release button 5, the user is able to instruct a photographing preparation operation such as an autofocus operation or an automatic exposure control operation. Further, by full-pressing the release button 5, the user is able to instruct photographing. An accessory such as an external flash is able to be detachably attached to the accessory shoe 6. In addition, the camera main body 1 is provided with an image pickup element 16 (see FIG. 2) that photoelectrically converts (picks up) a subject image formed by the image pickup optical system within the lens barrel 101. The lens barrel 101 is mechanically and electrically connected to a camera mount 7 provided on the camera main body 1 via its lens mount 102. As described above, the image pickup optical system is housed within the lens barrel 101. The image pickup optical system forms the subject image by image-forming a light from a subject.

As shown in FIG. 1B, a rear operation unit 8 and a display unit 9 are provided on the rear surface of the camera main body 1. The rear operation unit 8 includes a plurality of buttons and dials, to which various kinds of functions are assigned. When the power of the camera main body 1 is turned on (the camera main body 1 is in the power-on state) and the manual still image photographing mode, the automatic still image photographing mode, or the moving image photographing mode is set, the display unit 9 displays a through image of the subject image that is picked up by the image pickup element 16. In addition, photographing parameters, which indicate the photographing conditions such as the shutter speed and the aperture value, are displayed on the display unit 9, and the user is able to change setting values of the photographing parameters by operating the rear operation unit 8 while viewing the display on the display unit 9. The rear operation unit 8 includes a reproducing button for instructing reproducing of photographed images that are recorded, and by the user operating the reproducing button, the display unit 9 reproducing-displays the photographed images.

Figure 2:
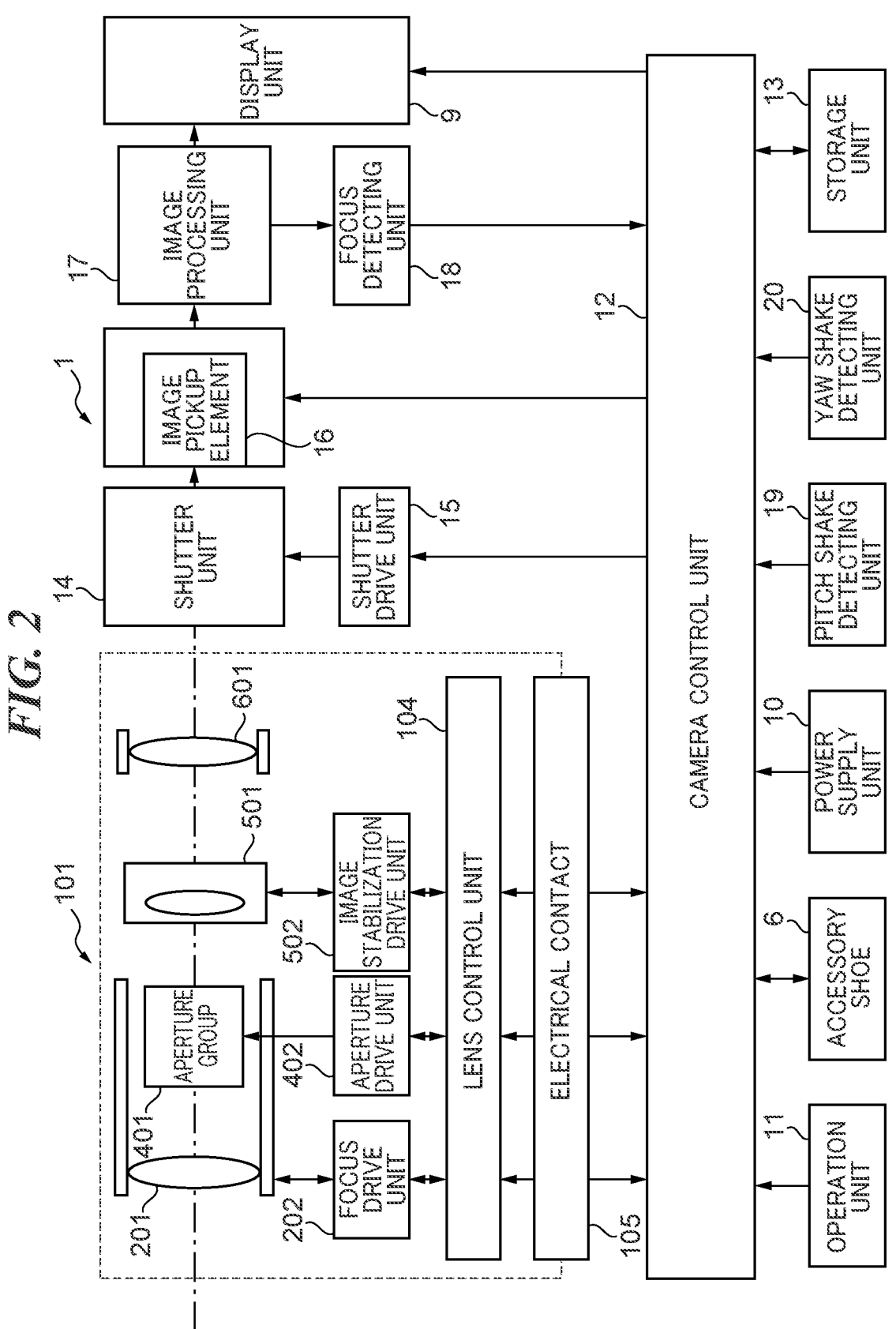
FIG. 2 is a block diagram that shows the electrical and optical configuration of the lens barrel and the digital camera.

FIG. 2 is a block diagram that shows the electrical and optical configuration of the lens barrel 101 and the camera main body 1. The camera main body 1 includes a power supply unit 10 that supplies electric power to the camera main body 1 and the lens barrel 101, the above-described power supply operation unit 3, the above-described mode dial 4, the above-described release button 5, the above-described rear operation unit 8, and an operation unit 11 including a touch panel function of the display unit 9. The control of the camera main body 1 and the lens barrel 101 as a whole system is performed by a camera control unit 12 provided in the camera main body 1 and a lens control unit 104 provided in the lens barrel 101, which cooperate with each other. The camera control unit 12 reads out a computer program stored in a storage unit 13 and executes it. At that time, the camera control unit 12 communicates with the lens control unit 104 via a communication terminal of an electrical contact 105 provided on the lens mount 102 (transmits/receives various kinds of control signals, various kinds of data, etc. to/from the lens control unit 104). Further, the electrical contact 105 includes a power supply terminal that supplies the electric power from the above-described power supply unit 10 to the lens barrel 101.

The image pickup optical system within the lens barrel 101 includes a focus group 201 including a focus lens 211 (see FIG. 3) that moves in the optical axis direction to perform focus adjustment, an aperture group 401 that performs a light amount adjusting operation, and an image stabilization group 501. The image stabilization group 501 includes a correction lens 506 (see FIG. 3) functioning as an image stabilization element that reduces the image blur. The image stabilization group 501 (the optical image stabilization unit) performs an image stabilization operation that reduces the image blur by moving (shifting) the correction lens 506 (see FIG. 3) in the Z/Y-axis direction perpendicular to the optical axis direction. Further, the lens barrel 101 includes a focus drive unit 202 that drives the focus group 201, an aperture drive unit 402 that drives the aperture group 401, and an image stabilization drive unit 502 that drives the image stabilization group 501. Moreover, the lens barrel 101 includes a first fixed group 601, which will be described below.

The camera main body 1 includes a shutter unit 14, a shutter drive unit 15, the image pickup element 16, an image processing unit 17, and the above-described camera control unit 12. The shutter unit 14 controls the amount of light that is collected by the image pickup optical system within the lens barrel 101 and is exposed by the image pickup element 16. The image pickup element 16 photoelectrically converts the subject image formed by the image pickup optical system and outputs image pickup signals. The image processing unit 17 performs various kinds of image processes with respect to the image pickup signals, and then generates image signals. The display unit 9 displays the image signals (the through image) outputted from the image processing unit 17, displays the photographing parameters as described above, or/and reproducing-displays the photographed images that are stored in the storage unit 13 or are recorded on a recording medium (not shown).

The camera control unit 12 controls the drive of the focus group 201 in response to the photographing preparation operation (a half-pressing operation of the release button 5) in the operation unit 11. For example, when the autofocus operation is instructed, a focus detecting unit 18 judges a focusing state of the subject image image-formed by the image pickup element 16 based on the image signals generated by the image processing unit 17, generates a focus signal, and transmits the focus signal to the camera control unit 12. At the same time, the focus drive unit 202 detects the current position of the focus group 201 and transmits the signal to the camera control unit 12 via the lens control unit 104. The camera control unit 12 compares the focusing state of the subject image with the current position of the focus group 201, calculates a focus drive amount based on the defocus amount, and transmits the focus drive amount to the lens control unit 104. Further, the lens control unit 104 drives and controls the focus group 201 to a target position via the focus drive unit 202, and corrects the defocus of the subject image. The forward/backward drive of the focus group 201 performed by the focus drive unit 202 is performed by an actuator that converts vibration of a piezoelectric element that generates ultrasonic vibration when a high-frequency voltage is applied into a driving force in a rectilinear direction. It should be noted that a stepping motor or a voice coil motor may be used as the actuator.

Further, the camera control unit 12 controls the drive of the aperture group 401 and the shutter unit 14 via the aperture drive unit 402 and the shutter drive unit 15 in response to the setting values of the aperture value and the shutter speed, which are received from the operation unit 11. For example, when the automatic exposure control operation is instructed, the camera control unit 12 receives luminance signals generated by the image processing unit 17 and performs a photometry calculation. Based on the result of the photometry calculation, the camera control unit 12 controls the drive of the aperture group 401 in response to the photographing instruction operation (a full-pressing operation of the release button 5) in the operation unit 11. At the same time, the camera control unit 12 controls the drive of the shutter unit 14 via the shutter drive unit 15 and performs an exposure process by the image pickup element 16. In addition, the accessory shoe 6 described above is connected to the camera control unit 12.

The camera main body 1 includes a pitch shake detecting unit 19 and a yaw shake detecting unit 20 that function as shake detecting means capable of detecting the image blur due to the camera shake by the user or the like. The pitch shake detecting unit 19 uses an angular velocity sensor (a vibrating gyro) to detect an image blur (due to a camera shake) in the pitch direction (the rotation direction around the Z-axis) and outputs a shake signal. Further, the yaw shake detecting unit 20 uses an angular acceleration sensor to detect an image blur (due to a camera shake) in the yaw direction (the rotation direction around the Y-axis) and outputs a shake signal. The camera control unit 12 calculates a shift position of the correction lens 506 (see FIG. 3) of the image stabilization group 501 in the Y-axis direction by using the shake signal outputted from the pitch shake detecting unit 19. Similarly, the camera control unit 12 calculates a shift position of the correction lens 506 (see FIG. 3) of the image stabilization group 501 in the Z-axis direction by using the shake signal outputted from the yaw shake detecting unit 20. Then, the camera control unit 12 drives and controls the image stabilization group 501 to a target position in response to the shift positions in the pitch/yaw direction calculated above, and performs the image stabilization operation that reduces the image blur that occurs during the exposure or displaying the through image.

Figure 3:
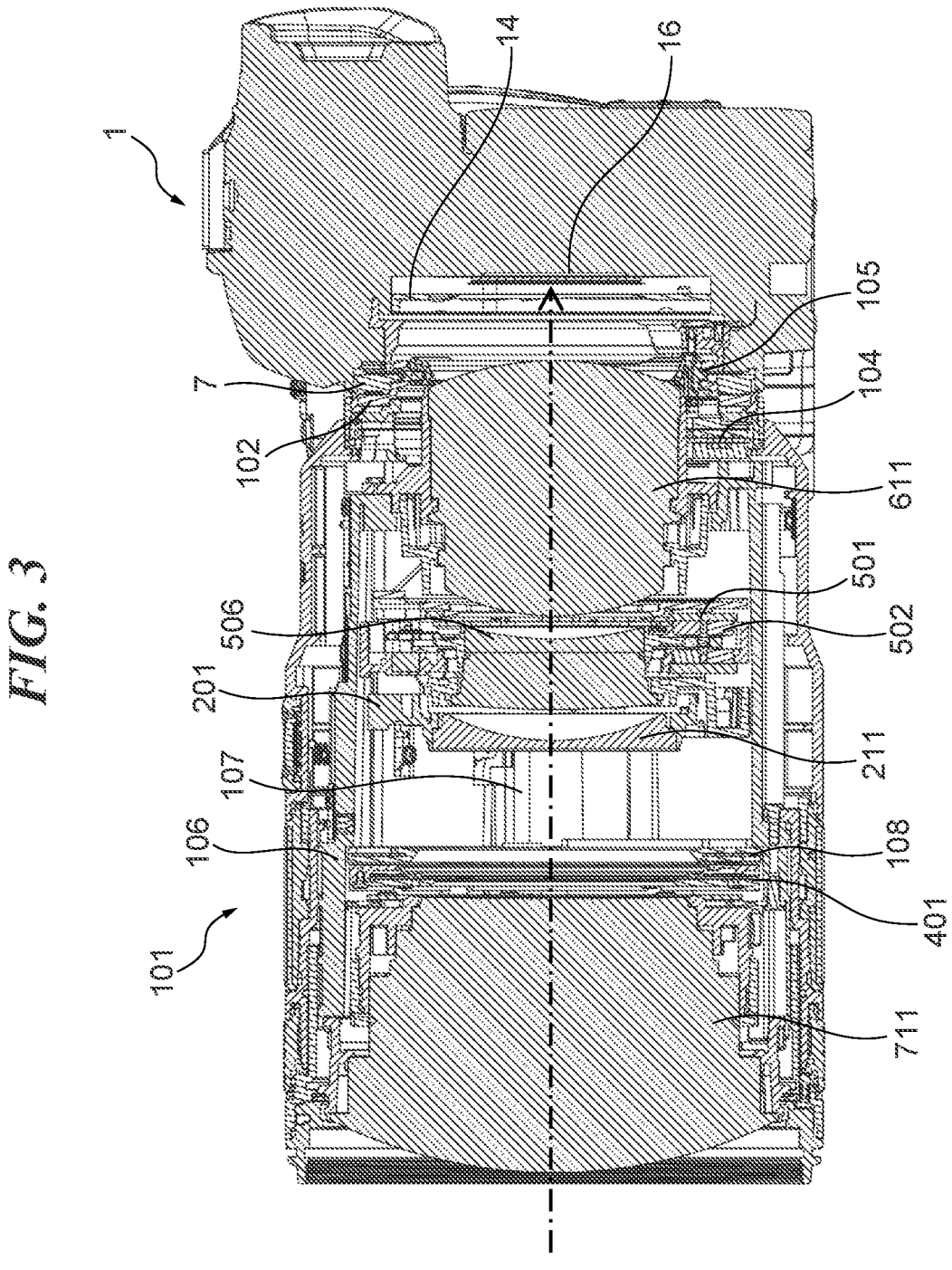
FIG. 3 is a cross-sectional view on an XY plane including an optical axis of the lens barrel and the digital camera, and is a view when a focus group is in a retracted state.
Figure 4:
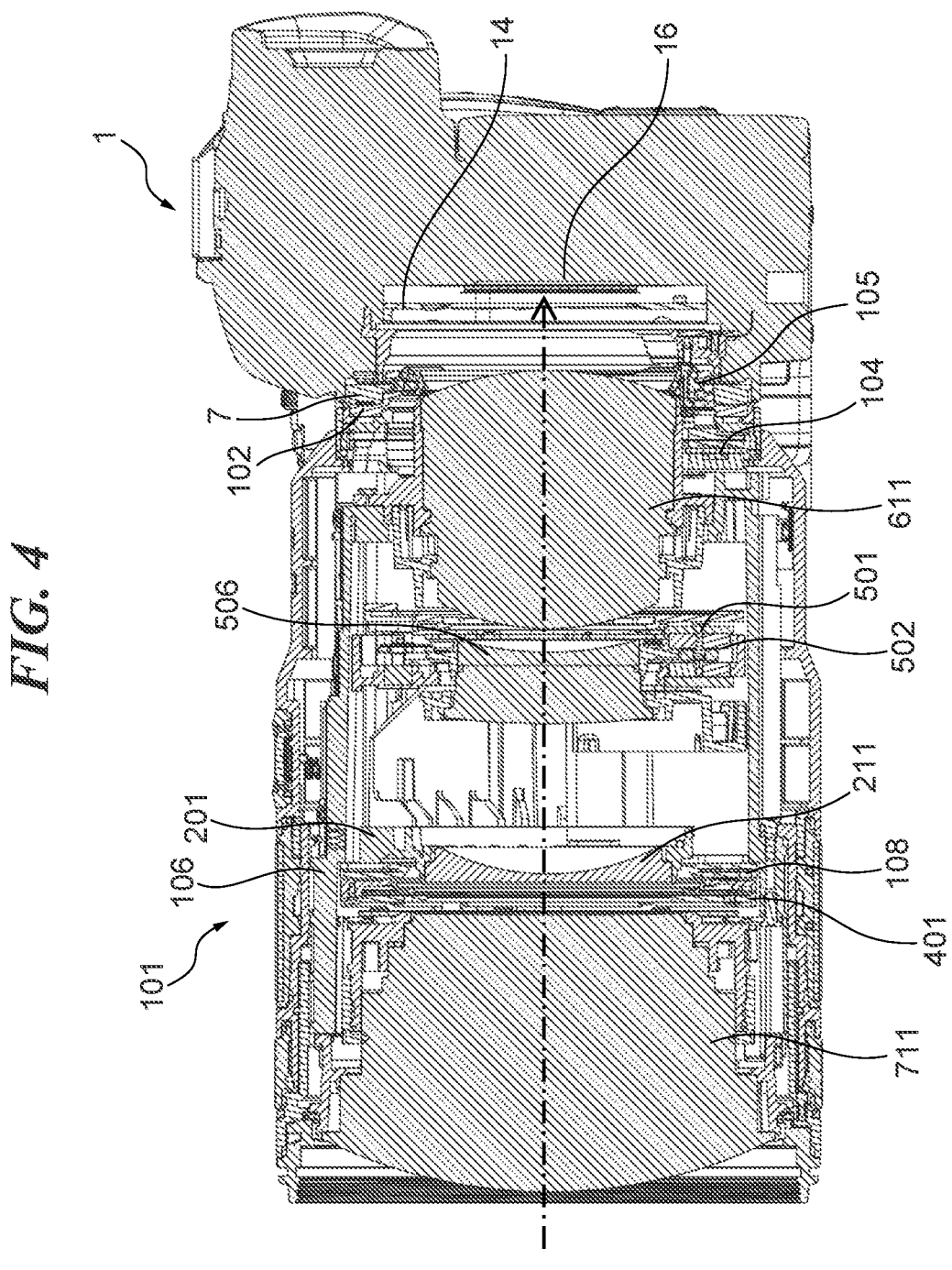
FIG. 4 is a cross-sectional view on the XY plane including the optical axis of the lens barrel and the digital camera, and is a view when the focus group is in an extended state.

Next, a positional relationship of the components in the lens barrel 101 and the camera main body 1 will be described with reference to FIGS. 3 to 5. FIG. 3 is a cross-sectional view on an XY plane including the optical axis of the lens barrel 101 and the camera main body 1, and is a view that shows a retracted state of the focus group 201. Furthermore, FIG. 4 is a cross-sectional view on the XY plane including the optical axis of the lens barrel 101 and the camera main body 1, and is a view that shows an extended state of the focus group 201. Since a center line shown here substantially coincides with the optical axis determined by the image pickup optical system described above, hereinafter it is synonymous with the optical axis. Furthermore, FIG. 5 is an exploded perspective view that shows the mechanism of internal components in the lens barrel 101.

Figure 5:
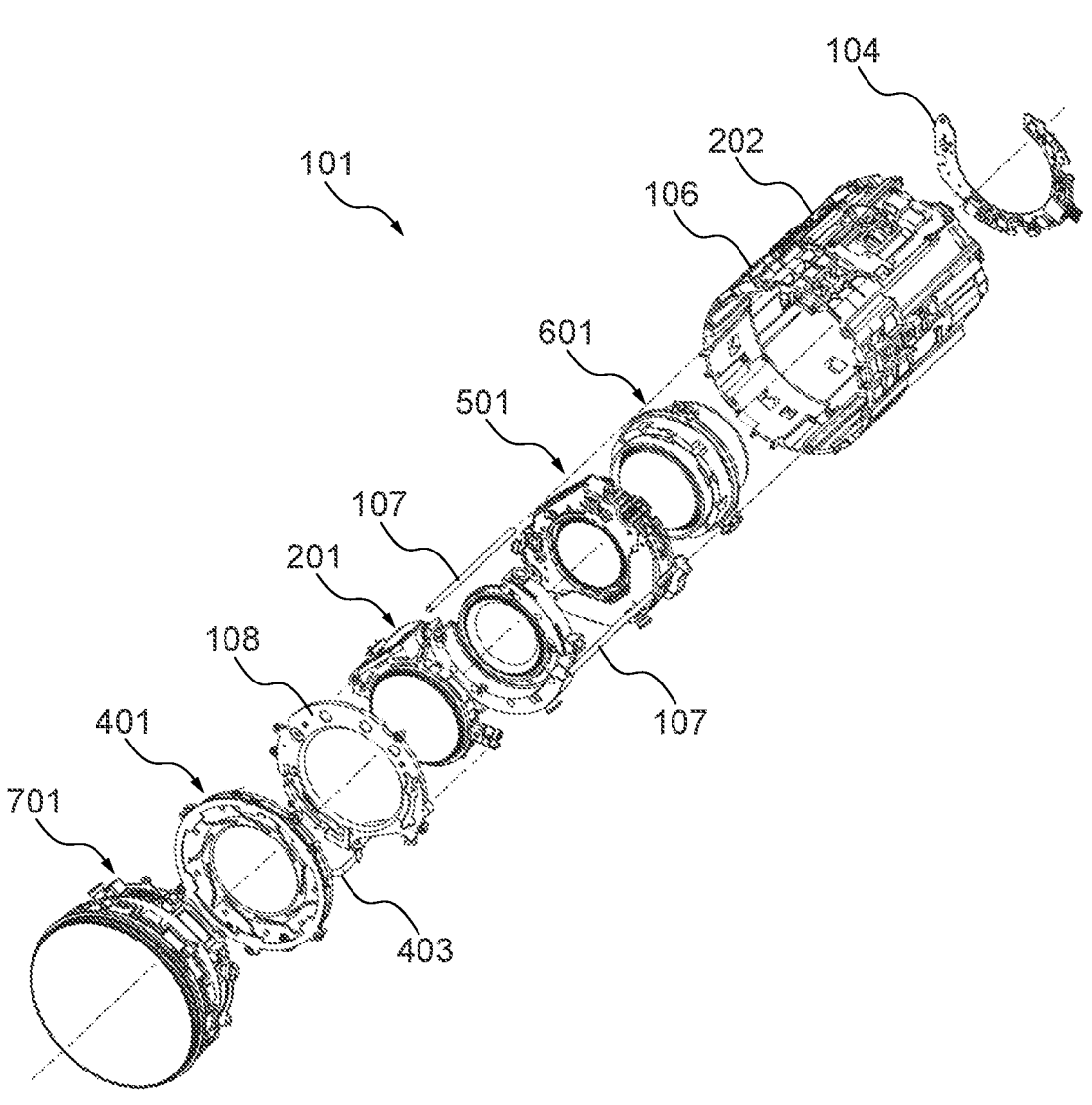
FIG. 5 is an exploded perspective view that shows the mechanism of internal components in the lens barrel.

As shown in FIGS. 3 to 5, the first fixed group 601 is a holding member that holds a first fixed lens 611 on its inner peripheral side. The first fixed group 601 is inserted and incorporated into an inner peripheral side of a main base 106 from the rear side, and is fixed with screws in the optical axis direction. The image stabilization group 501 is inserted and incorporated into the inner peripheral side of the main base 106 from the front side. In addition, the image stabilization group 501 is housed on the inner peripheral side of the main base 106 via an adjustment roller, which is an adjustment mechanism. The image stabilization group 501 includes the correction lens 506 (a lens). Details of the image stabilization group 501 will be described below. One end of a plurality of guide bars 107 is held by the main base 106, and the other end of the plurality of guide bars 107 is held by a bar holder 108 fixed to the main base 106.

The focus group 201 holds the focus lens 211 and is inserted and incorporated into the inner peripheral side of the main base 106 via the plurality of guide bars 107 from the front side. Furthermore, the focus group 201 is guided by the plurality of guide bars 107, and receives the driving force generated by the focus drive unit 202 to advance and retreat (move forward and backward) in the optical axis direction. The aperture group 401 is inserted and incorporated into the inner peripheral side of the main base 106 from the rear side, and is fixed with screws in the optical axis direction. The aperture drive unit 402 is electrically connected to the aperture group 401 via a flexible printed wiring board 403. The flexible printed wiring board 403 passes through an opening provided in the main base 106, is relayed to a flexible printed wiring board (not shown) disposed on an outer peripheral side of the main base 106, and is connected to the lens control unit 104. A second fixed group 701 is a holding member that holds a second fixed lens 711 on its inner peripheral side. The second fixed group 701 is inserted and incorporated into the inner peripheral side of the main base 106 from the front side. In addition, the second fixed group 701 is housed on the inner peripheral side of the main base 106 via an adjustment roller, which is an adjustment mechanism.

Figure 6:
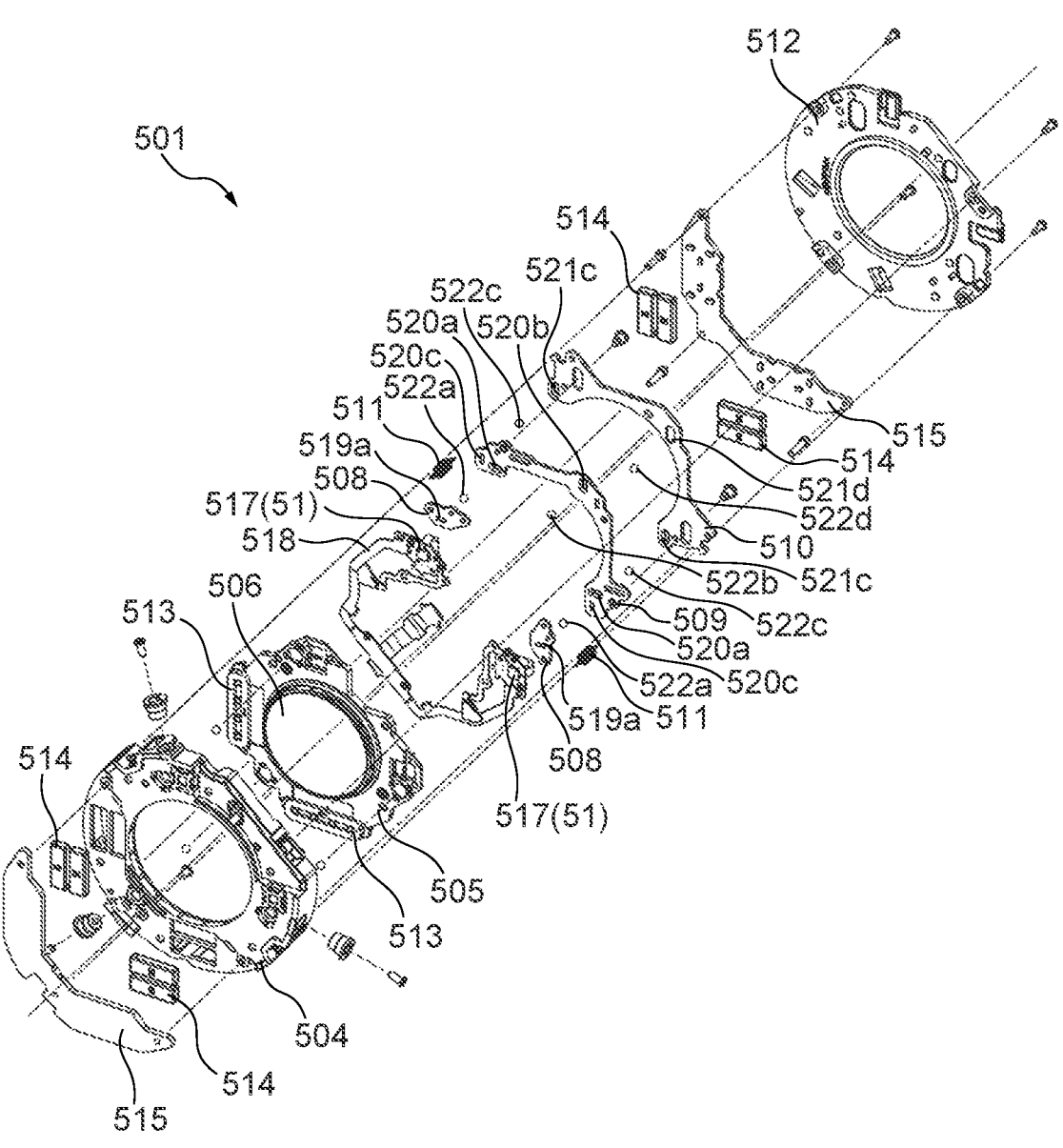
FIG. 6 is an exploded perspective view that shows the mechanism of an image stabilization group of the lens barrel.

Next, the mechanism of the image stabilization group 501 of the lens barrel 101 will be described in detail with reference to FIG. 6. FIG. 6 is an exploded perspective view that shows the mechanism of the image stabilization group 501 of the lens barrel 101. Reference numeral 504 denotes a base member (a fixed member), and the image stabilization group 501 is configured with the base member 504 as a base. Reference numeral 505 denotes a lens holding member (a movable member), and the lens holding member 505 holds the correction lens 506. Further, the lens holding member 505 is supported by a biasing member 511 via first guide members 508, a second guide member 509, and a third guide member 510 so as to be movable on the base member 504 in a direction substantially perpendicular to the optical axis direction. That is, the lens holding member 505 is able to move on a plane substantially perpendicular to the optical axis direction. A method for supporting the lens holding member 505 will be described below. The biasing member 511 is configured by a retraction spring. The lens holding member 505 is biased toward the base member 504 by the biasing member 511. A cover 512 (the fixed member) is fixed to the base member 504 so as to sandwich the lens holding member 505. Although the fixation is performed by fastening with screws, the fixation is able to take various kinds of forms.

Two sets of coils 513 are held by the lens holding member 505 with their respective phases shifted by 90 degrees. In addition, two sets of driving magnets 514 are held by the base member 504. The two sets of driving magnets 514 are disposed at positions facing the two sets of coils 513, respectively. Each set of driving magnets 514 is configured by a pair of driving magnets 514. In addition, a pair of yokes 515 corresponding to the pair of driving magnets 514 are respectively held by the base member 504. The pair of yokes 515 is disposed so as to sandwich the base member 504. The coils 513 are electrically connected by being soldered to a flexible printed wiring board 518. In this way, the coils 513 are within a magnetic field created by the driving magnets 514 and the yokes 515. Therefore, by applying an electric current to the coils 513, a driving force when moving on the base member 504 in the direction substantially perpendicular to the optical axis direction is generated in the lens holding member 505 that holds the coils 513. It should be noted that the image stabilization drive unit 502 described above is configured by the coils 513, the driving magnets 514, and the yokes 515.

In addition to the driving magnets 514, the base member 504 holds two position detection magnets (not shown) for detecting a position of the lens holding member 505 with their phases shifted by 90 degrees. In addition, two position detection sensors 517 are mounted on sensor mounting portions 51 of the flexible printed wiring board 518 so as to face the two position detection magnets, respectively, with their phases shifted by 90 degrees, and are held by the lens holding member 505. When the lens holding member 505 is driven, each position detection sensor 517 converts a change in a magnetic flux density of each position detection magnet into an electric signal and outputs the electric signal. Accordingly, based on the electric signal outputted from each position detection sensor 517, it is possible to detect a position when the lens holding member 505 moves on the base member 504 in the direction substantially perpendicular to the optical axis direction. As a result, it becomes possible to perform the control for the camera shake correction.

Next, the method for supporting the lens holding member 505 will be described. A pair of first guide members 508 are fixed to the lens holding member 505. Although the fixation is performed by fastening with screws, the fixation is able to take various kinds of forms. Each first guide member 508 of the pair of first guide members 508 is provided with a V-groove shape 519a on the side opposite to the lens holding member 505. The second guide member 509 is provided with a V-groove shape 520a at a position opposite to the V-groove shape 519a of the first guide member 508. That is, the second guide member 509 is provided with two V-groove shapes 520a. Not only a longitudinal direction of the V-groove shape 519a but also a longitudinal direction of the V-groove shape 520a is the Z-axis direction, and the V-groove shape 519a and the V-groove shape 520a have longitudinal shapes in the same direction (in the Z-axis direction). A rolling member 522a is disposed between the V-groove shape 519a and the V-groove shape 520a, which are in an opposite relationship (which are opposite to each other). That is, two rolling members 522a are disposed between the pair of first guide members 508 and the second guide member 509. In this way, each rolling member 522a is sandwiched by the V-groove shape 519a and the V-groove shape 520a, which are in the opposite relationship.

Further, the second guide member 509 is provided with a V-groove shape 520b between the two V-groove shapes 520a. A longitudinal direction of the V-groove shape 520b is the Y-axis direction, which is a direction perpendicular to the V-groove shape 519a and the V-groove shape 520a, and the V-groove shape 520b has a longitudinal shape in the Y-axis direction. The base member 504 is provided with a plane portion (not shown) at a position opposite to the V-groove shape 520b of the second guide member 509. A rolling member 522b is disposed between the plane portion of the base member 504 and the V-groove shape 520b of the second guide member 509. That is, one rolling member 522b is disposed between the base member 504 and the second guide member 509. In this way, the rolling member 522b is sandwiched by the plane portion of the base member 504 and the V-groove shape 520b of the second guide member 509.

As described above, the lens holding member 505 is stably disposed with a total of three rolling members (the two rolling members 522a and the one rolling member 522b) with respect to the second guide member 509 in a state of being integrated with the pair of first guide members 508. Furthermore, the lens holding member 505 becomes able to perform rolling drive in the Z-axis direction along the V-groove shape 519a and the V-groove shape 520a with respect to the second guide member 509 in the state of being integrated with the pair of first guide members 508.

In addition, the second guide member 509 is provided with a pair of V-groove shapes 520c on the side opposite to the lens holding member 505. The third guide member 510 is provided with a V-groove shape 521c at a position opposite to the V-groove shape 520a of the second guide member 509. That is, the third guide member 510 is provided with two V-groove shapes 521c. Not only a longitudinal direction of the V-groove shape 520c but also a longitudinal direction of the V-groove shape 521c is the Y-axis direction, and the V-groove shape 520c and the V-groove shape 521c have longitudinal shapes in the same direction (in the Y-axis direction). A rolling member 522c is disposed between the V-groove shape 520c and the V-groove shape 521c, which are in an opposite relationship (which are opposite to each other). That is, two rolling members 522c are disposed between the second guide member 509 and the third guide member 510. In this way, each rolling member 522c is sandwiched by the V-groove shape 520c and the V-groove shape 521c, which are in the opposite relationship.

Further, the third guide member 510 is provided with a V-groove shape 521d between the two V-groove shapes 520c. A longitudinal direction of the V-groove shape 521d is the Y-axis direction, which is the same direction as the V-groove shape 520c and the V-groove shape 521c, and the V-groove shape 521d has a longitudinal shape in the Y-axis direction. The second guide member 509 is provided with a plane portion (not shown) at a position opposite to the V-groove shape 521d of the third guide member 510. A rolling member 522d is disposed between the plane portion of the second guide member 509 and the V-groove shape 521d of the third guide member 510. That is, one rolling member 522d is disposed between the second guide member 509 and the third guide member 510. In this way, the rolling member 522d is sandwiched by the plane portion of the second guide member 509 and the V-groove shape 521d of the third guide member 510.

As described above, the second guide member 509 is stably disposed with a total of three rolling members (the two rolling members 522c and the one rolling member 522d) with respect to the third guide member 510. Furthermore, the lens holding member 505 becomes able to perform rolling drive in the Y-axis direction along the V-groove shape 520c, the V-groove shape 521c, and the V-groove shape 521d with respect to the third guide member 510 through the second guide member 509 in the state of being integrated with the pair of first guide members 508.

With the above combination, the second guide member 509 becomes able to perform the drive in the Y-axis direction with respect to the third guide member 510. In addition, the lens holding member 505 becomes able to perform the drive in the Z-axis direction with respect to the second guide member 509 in the state of being integrated with a plurality of first guide members 508. Therefore, the lens holding member 505 becomes able to perform the drive in the Y-axis direction and the Z-axis direction while the movement in the rotation direction is restricted with respect to the base member 504, and is able to move within the plane substantially perpendicular to the X-axis direction, which is the optical axis direction.

Figure 7A:
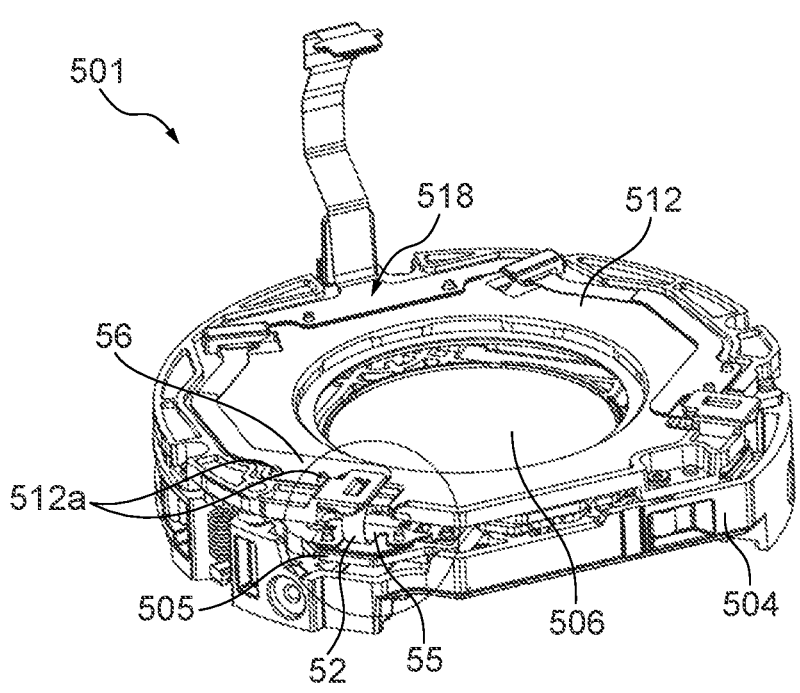
FIG. 7A is a perspective view of the image stabilization group.
Figure 7B:
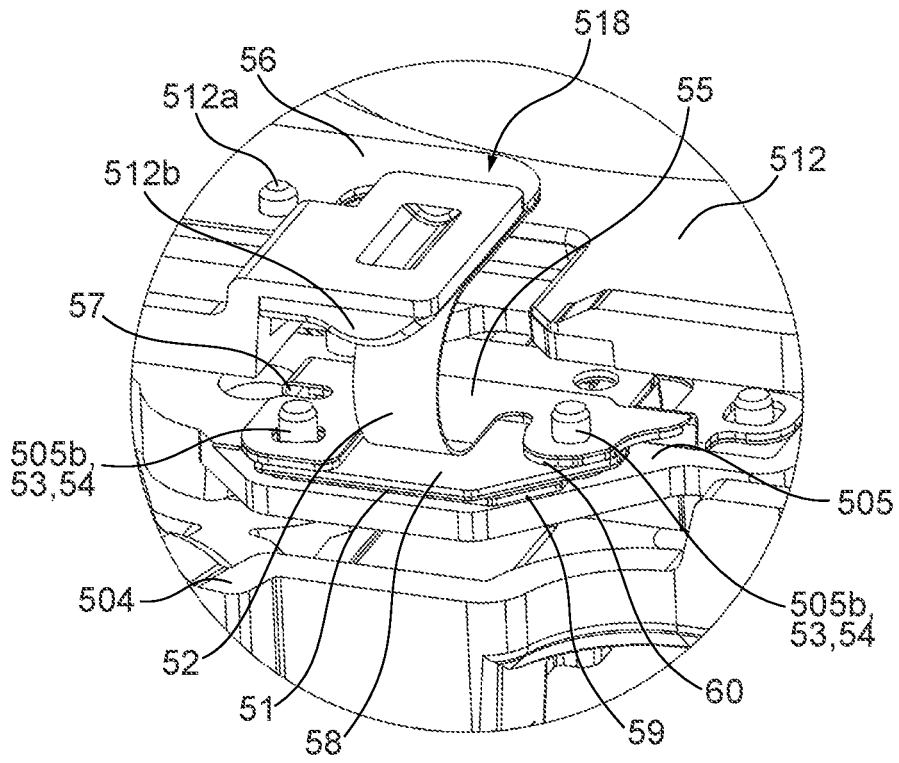
FIG. 7B is a partially enlarged view of FIG. 7A.
Figure 8A:
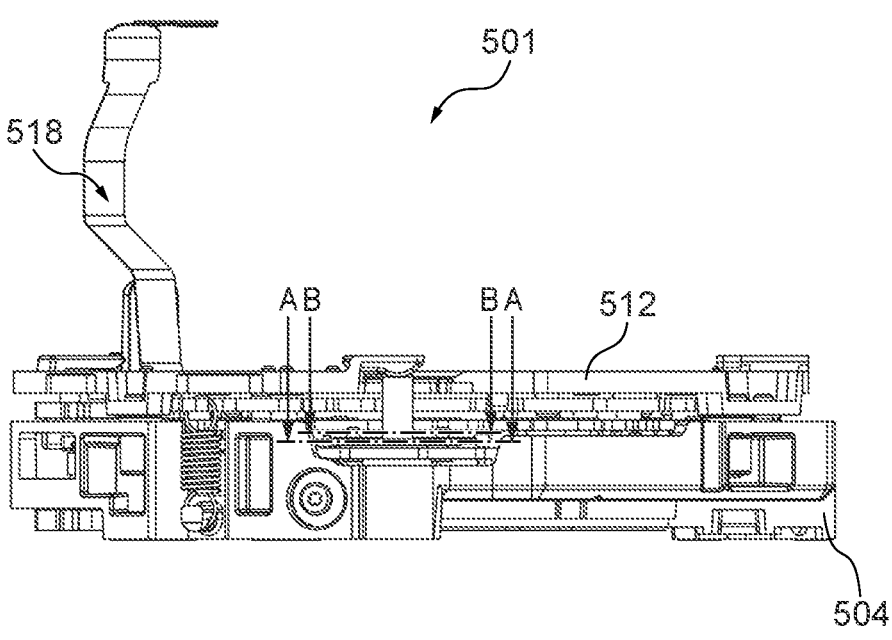
FIG. 8A is a side view of the image stabilization group.
Figure 8B:
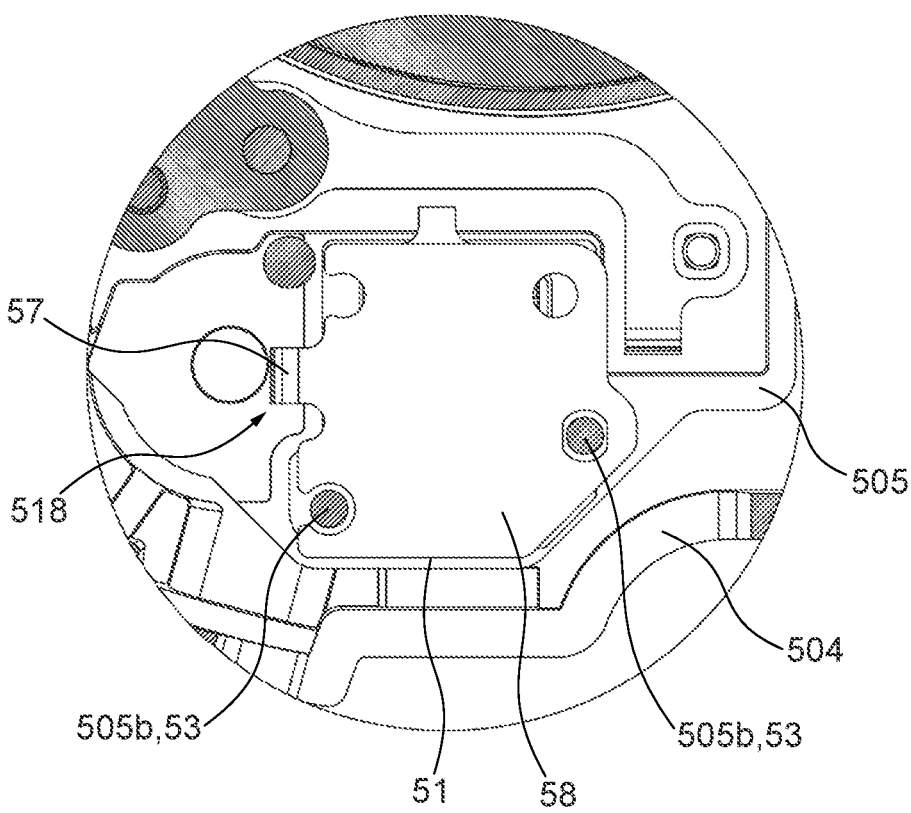
FIG. 8B is a view that shows a cross section when the image stabilization group is cut along A-A of FIG. 8A.
Figure 8C:
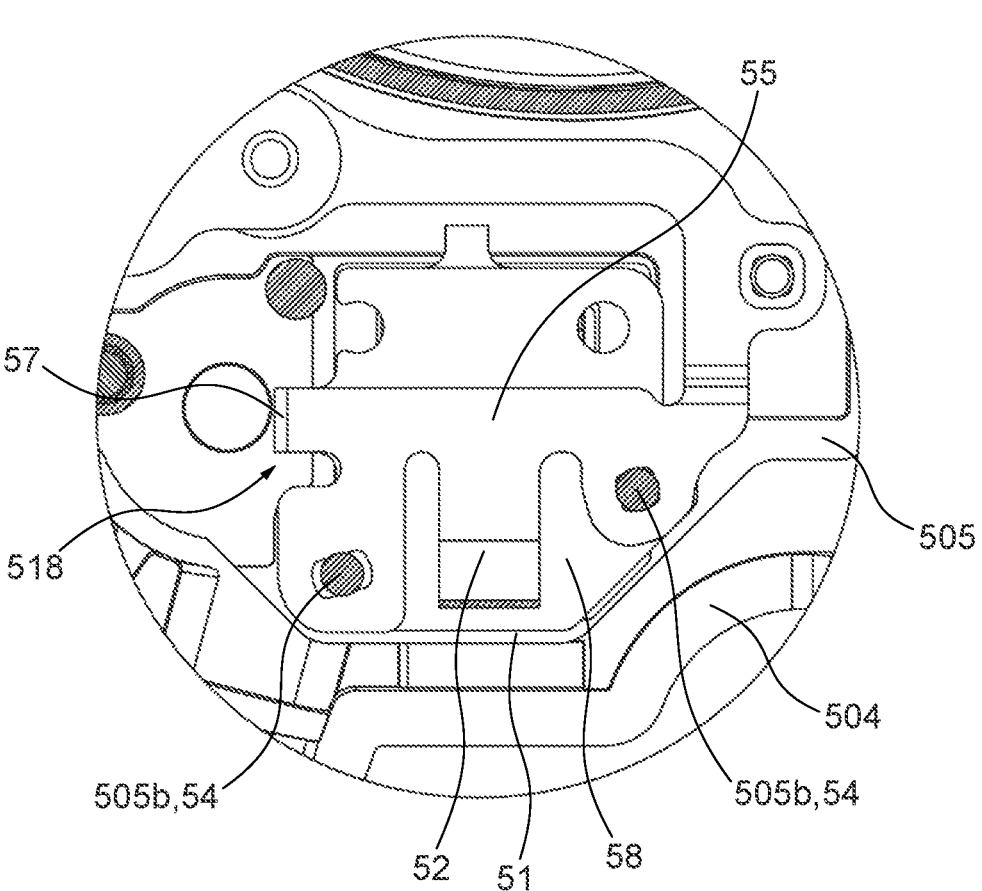
FIG. 8C is a view that shows a cross section when the image stabilization group is cut along B-B of FIG. 8A.
Figure 9A:
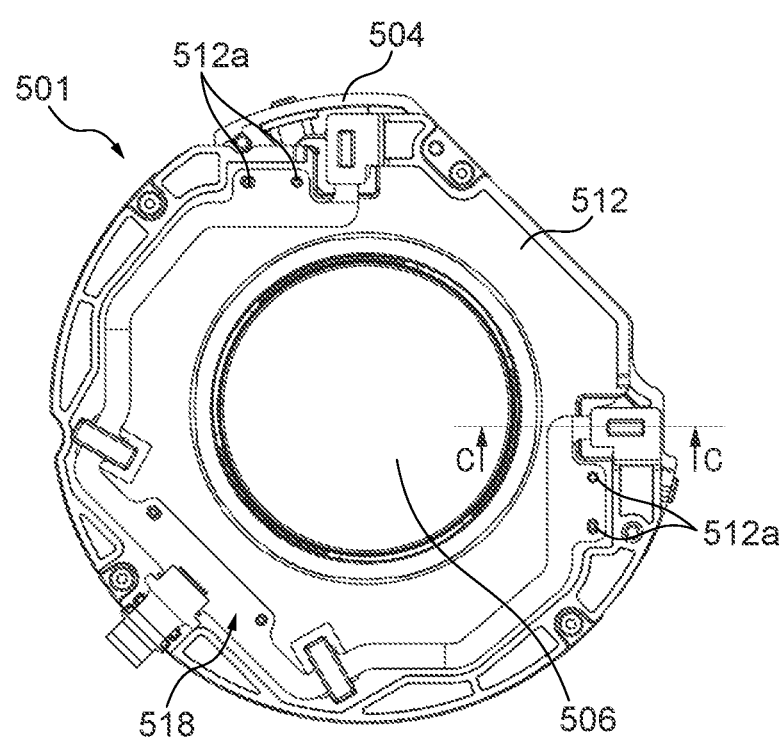
FIG. 9A is a plan view of the image stabilization group.
Figure 9B:
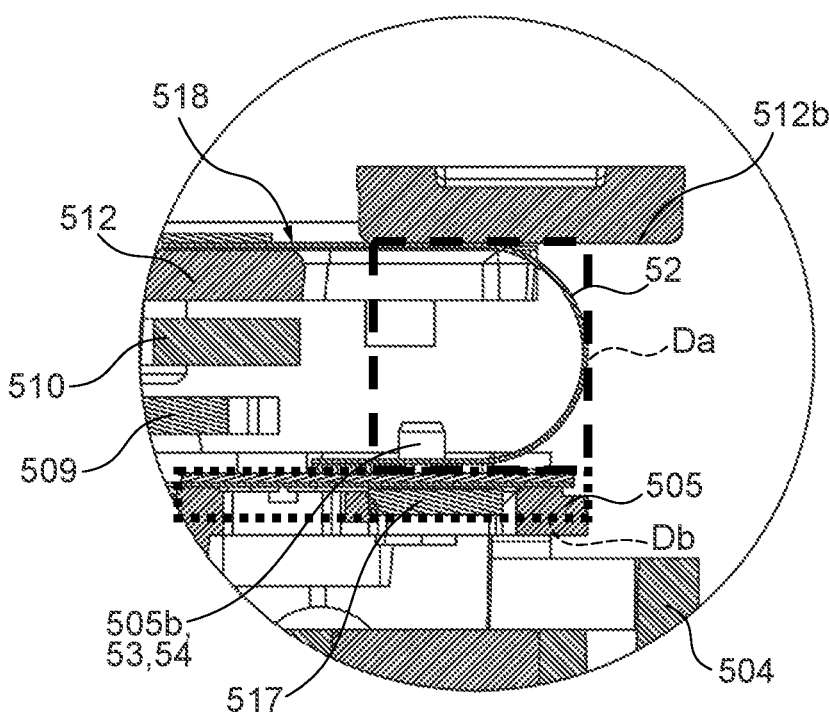
FIG. 9B is a view that shows a cross section when the image stabilization group is cut along C-C of FIG. 9A.

Next, the configuration of the flexible printed wiring board 518 in the image stabilization group 501 will be described with reference to FIGS. 7A, 7B, 8A, 8B, 8C, 9A and 9B. FIG. 7A is a perspective view of the image stabilization group 501. FIG. 7B is a partially enlarged view of FIG. 7A, and is a perspective view that shows a routing state of the flexible printed wiring board 518 near a bending portion 52 of the flexible printed wiring board 518. FIG. 8A is a side view of the image stabilization group 501. FIG. 8B is a cross-sectional view taken along A-A of FIG. 8A. FIG. 8C is a cross-sectional view taken along B-B of FIG. 8A. FIG. 9A is a plan view of the image stabilization group 501. FIG. 9B is a cross-sectional view taken along C-C of FIG. 9A.

As shown in FIG. 7A, the flexible printed wiring board 518 is laid on the cover 512 of the image stabilization group 501. A fixed side holding portion 56 of the flexible printed wiring board 518 is fixed to the cover 512 while its position on the cover 512 is determined by a pair of positioning pins 512a provided on the cover 512. In addition, the flexible printed wiring board 518 is fixed to the cover 512 and the lens holding member 505 so that the bending portion 52 of the flexible printed wiring board 518 becomes movable between the cover 512 and the lens holding member 505. It should be noted that the fixation is performed by the fixed side holding portion 56 described above and a movable side holding portion 55 described below. The bending portion 52 of the flexible printed wiring board 518 connects the fixed side holding portion 56 and the movable side holding portion 55, and has a curved shape protruding outward from the cover 512 and the lens holding member 505. In addition, when the bending portion 52 is viewed along its width direction, the curved portion of the bending portion 52 has a substantially semicircular shape (see FIG. 9B).

In the preferred embodiment of the present invention, the flexible printed wiring board 518 serves to energize the coils 513 and the position detection sensors 517 held by the lens holding member 505. Conventionally, in an optical image stabilization unit including a flexible printed wiring board that plays such a role, it is necessary to provide the flexible printed wiring board with a connection shape that bridges the flexible printed wiring board between a fixed member of the optical image stabilization unit and a movable member of the optical image stabilization unit. In addition, in order to prevent twisting of the connection shape that is caused by variations in assembly and mounting misalignment of the position detection sensor, in the fixed member and the movable member of the optical image stabilization unit, it is required to determine the position where the flexible printed wiring board is fixed with high accuracy. Furthermore, in order to secure the durability of the flexible printed wiring board, it is required to suppress a stress of the flexible printed wiring board generated with the movement of the movable member. Therefore, it is desirable to use a structure in which the connection shape is, for example, a substantially semicircular shape, and the rigidity of the flexible printed wiring board is reduced. In view of this point, in the preferred embodiment of the present invention, the connection shape is realized as the bending portion 52 of the flexible printed wiring board 518.

As shown in FIG. 7B, the cover 512 is provided with an abutment shape 512b at a portion where the bending portion 52 of the flexible printed wiring board 518 abuts. The abutment shape 512b has a substantially semi-cylindrical shape that protrudes toward the bending portion 52 of the flexible printed wiring board 518. In addition, when the abutment shape 512b is viewed from a direction of a central axis of the substantially semi-cylindrical shape of the abutment shape 512b, the abutment shape 512b has a substantially semicircular shape. That is, a side surface of the abutment shape 512b having the substantially semi-cylindrical shape has a curvature indicating that the abutment shape 512b protrudes toward the bending portion 52 of the flexible printed wiring board 518. As a result, the abutment shape 512b of the cover 512 suppresses a stress of the flexible printed wiring board 518 generated with the movement of the lens holding member 505.

In addition, when the cover 512 is viewed from the optical axis direction, the abutment shape 512b is disposed on the cover 512 so that the center in a circumferential direction (a circumferential direction center), which is the central axis of the abutment shape 512b having the substantially semi-cylindrical shape, coincides with the center in the width direction (a width direction center) of the bending portion 52 of the flexible printed wiring board 518. Therefore, as the lens holding member 505 moves, the bending portion 52 of the flexible printed wiring board 518 moves along the substantially semicircular shape of the side surface of the abutment shape 512b provided on the cover 512, and as a result, the bending portion 52 of the flexible printed wiring board 518 is easily deformed in a twisting direction. Thus, the flexible printed wiring board 518 has excellent durability.

In addition, the flexible printed wiring board 518 is laid on the lens holding member 505. The position detection sensor 517 (see FIG. 9B) held by the lens holding member 505 is electrically connected by the sensor mounting portion 51 of the flexible printed wiring board 518. The sensor mounting portion 51 of the flexible printed wiring board 518 is fixed on a sensor mounting surface provided on the lens holding member 505 by, for example, thermal caulking or UV adhesive. In the sensor mounting portion 51 of the flexible printed wiring board 518, a reinforcing plate 59 (a second spacer) is stuck on a surface on the lens holding member 505 side of the sensor mounting portion 51. That is, the reinforcing plate 59 is interposed between the sensor mounting portion 51 of the flexible printed wiring board 518 and the lens holding member 505. Further, the sensor mounting portion 51 of the flexible printed wiring board 518 has a surface that is a surface on the cover 512 side of the sensor mounting portion 51 and is opposite to the surface, on which the reinforcing plate 59 is stuck, as a holding surface 58.

In addition, the flexible printed wiring board 518 is laid on the holding surface 58 of the sensor mounting portion 51 of the flexible printed wiring board 518 from the sensor mounting surface provided on the lens holding member 505. Therefore, the flexible printed wiring board 518 is folded near an edge end of the sensor mounting portion 51 by a bent portion 57 of the flexible printed wiring board 518. That is, the flexible printed wiring board 518 is folded near the edge end of the sensor mounting portion 51 from the side opposite to the position detection sensor 517 to the side where the position detection sensor 517 is mounted in the sensor mounting portion 51. As a result, in the flexible printed wiring board 518, even in the case that the mounting misalignment of the position detection sensor 517 occurs in the sensor mounting portion 51, since the mounting misalignment of the position detection sensor 517 is absorbed by the bent portion 57, the bending portion 52 is prevented from being affected by the mounting misalignment of the position detection sensor 517.

In addition, the sensor mounting portion 51 and the movable side holding portion 55 of the flexible printed wiring board 518 are fixed to the lens holding member 505 while their positions on the lens holding member 505 are determined by a pair of positioning pins 505b provided on the lens holding member 505. It should be noted that the pair of positioning pins 505b correspond to a plurality of positioning portions. The sensor mounting portion 51 of the flexible printed wiring board 518 has a pair of positioning holes 53 at locations corresponding to the pair of positioning pins 505b, and the pair of positioning holes 53 are used for performing positioning, rotation stopping, and fixation in the lens holding member 505 of the sensor mounting portion 51 of the flexible printed wiring board 518. Similarly, the movable side holding portion 55 of the flexible printed wiring board 518 has a pair of positioning holes 54 at locations corresponding to the pair of positioning pins 505b, and the pair of positioning holes 54 are used for performing positioning, rotation stopping, and fixation in the lens holding member 505 of the movable side holding portion 55 of the flexible printed wiring board 518.

Hereinafter, the positioning of the sensor mounting portion 51 of the flexible printed wiring board 518 and the movable side holding portion 55 of the flexible printed wiring board 518 will be described in more detail. As described above, the flexible printed wiring board 518 is folded by the bent portion 57 of the flexible printed wiring board 518. As a result, the sensor mounting portion 51 of the flexible printed wiring board 518 and the movable side holding portion 55 of the flexible printed wiring board 518 are overlapped.

FIG. 8B is a cross-sectional view on the holding surface 58, which is the surface on the cover 512 side of the sensor mounting portion 51 of the flexible printed wiring board 518. As shown in FIG. 8B, the positioning, the rotation stopping, and the fixation in the lens holding member 505 of the sensor mounting portion 51 of the flexible printed wiring board 518 are performed by the pair of positioning holes 53 and the pair of positioning pins 505b. A gap is provided between the positioning hole 53 and the positioning pin 505b. The gap provided between the positioning hole 53 and the positioning pin 505b has an amount capable of absorbing the inclination or the like of the sensor mounting portion 51 due to the mounting misalignment of the position detection sensor 517.

FIG. 8C is a cross-sectional view on the movable side holding portion 55 of the flexible printed wiring board 518. As described above, by being folded by the bent portion 57 of the flexible printed wiring board 518, the flexible printed wiring board 518 is laid on the holding surface 58 from the edge end of the sensor mounting portion 51. As a result, the movable side holding portion 55 of the flexible printed wiring board 518 is disposed so as to be superimposed on the holding surface 58, which is the surface opposite to the lens holding member 505 side of the sensor mounting portion 51. As shown in FIG. 8C, the positioning, the rotation stopping, and the fixation in the lens holding member 505 of the movable side holding portion 55 of the flexible printed wiring board 518 are performed by the pair of positioning holes 54 and the pair of positioning pins 505b. The pair of positioning pins 505b are lightly press-fitted into the pair of positioning holes 54 to determine their positions in the pair of positioning holes 54. Therefore, the pair of positioning holes 54 of the flexible printed wiring board 518 become difficult to be removed from the pair of positioning pins 505b of the lens holding member 505. In this way, the flexible printed wiring board 518 is fixed to the lens holding member 505. Further, the flexible printed wiring board 518 and the lens holding member 505 may be fastened by performing thermal caulking on the pair of positioning pins 505b of the lens holding member 505.

As described above, the positioning in the lens holding member 505 of the sensor mounting portion 51 of the flexible printed wiring board 518 and the positioning in the lens holding member 505 of the movable side holding portion 55 of the flexible printed wiring board 518 are performed together by the pair of positioning pins 505b provided on the lens holding member 505. In this way, the image stabilization group 501 uses the pair of positioning pins 505b in common for the sensor mounting portion 51 of the flexible printed wiring board 518 and the movable side holding portion 55 of the flexible printed wiring board 518, so that the miniaturization within the plane substantially perpendicular to the optical axis direction is realized.

In the movable side holding portion 55 of the flexible printed wiring board 518, a reinforcing plate 60 (a first spacer) is stuck on the side facing the holding surface 58 of the sensor mounting portion 51. That is, the reinforcing plate 60 is interposed between the movable side holding portion 55 of the flexible printed wiring board 518 and the sensor mounting portion 51 and between the pair of positioning pins 505b provided on the lens holding member 505. On the other hand, in order to give flexibility to the bending portion 52 and the bent portion 57 of the flexible printed wiring board 518, the reinforcing plate 60 is not stuck on the bending portion 52 and the bent portion 57 of the flexible printed wiring board 518. In this way, in the flexible printed wiring board 518, since the reinforcing plate 60 is not stuck on the bending portion 52, a gap corresponding to the thickness of the reinforcing plate 60 is provided between the bending portion 52 and the holding surface 58 of the sensor mounting portion 51. In the flexible printed wiring board 518, due to the gap provided between the bending portion 52 and the holding surface 58 of the sensor mounting portion 51, the twisting deformation of the bending portion 52 that occurs with the movement of the lens holding member 505 is absorbed.

In addition, in the flexible printed wiring board 518, a large stress is generated by the twisting deformation of the bending portion 52 at a base portion of the bending portion 52 near a boundary between the bending portion 52 and the movable side holding portion 55. At the base portion of the bending portion 52 where such stress concentration occurs, the closer an edge of the reinforcing plate 60 is located, the larger a load on a wiring pattern of the flexible printed wiring board 518. Therefore, in the movable-side holding portion 55 of the flexible printed wiring board 518, the reinforcing plate 60 is stuck on the movable side holding portion 55 so that the edge of the reinforcing plate 60 is located at a position apart from the base portion of the bending portion 52 and is also located on the side opposite to the bending portion 52. As a result, the load on the wiring pattern of the flexible printed wiring board 518 is reduced. Furthermore, a movable range of the bending portion 52 of the flexible printed wiring board 518 is increased.

Next, a positional relationship of the bending portion 52 of the flexible printed wiring board 518 in the image stabilization group 501 will be described. As shown in FIG. 7B described above, the bending portion 52 of the flexible printed wiring board 518 is disposed between the pair of positioning pins 505b provided on the lens holding member 505. As a result, the miniaturization within the plane substantially perpendicular to the optical axis direction of the image stabilization group 501 is realized.

In addition, as shown in FIG. 9B, the flexible printed wiring board 518 is fixed to the cover 512 and the lens holding member 505 so that the bending portion 52 of the flexible printed wiring board 518 becomes movable. In FIG. 9B, a region Da of the bending portion 52 and a region Db of the sensor mounting portion 51 when the bending portion 52 is viewed along the width direction of the bending portion 52 of the flexible printed wiring board 518, which is a direction perpendicular to the optical axis direction, are represented by dashed lines. When the base member 504 is viewed from the optical axis direction (a vertical direction in FIGS. 9A and 9B), the region Da of the bending portion 52 and the region Db of the sensor mounting portion 51 are disposed so as to be overlapped, and furthermore, the region Da of the bending portion 52 is contained within the region Db of the sensor mounting portion 51. That is, when the flexible printed wiring board 518 is viewed from the optical axis direction (the vertical direction in FIGS. 9A and 9B), the bending portion 52 and the sensor mounting portion 51 are disposed so as to be overlapped. As a result, since it is possible to eliminate the waste of a space for routing the flexible printed wiring board 518, the miniaturization within the plane substantially perpendicular to the optical axis direction of the image stabilization group 501 is realized.

In addition, when the base member 504 is viewed from the optical axis direction (the vertical direction in FIGS. 9A and 9B), at least a portion of the abutment shape 512b of the cover 512 overlaps the region Da of the bending portion 52 and the region Db of the sensor mounting portion 51. Here, although different from the preferred embodiment of the present invention, it is assumed that the abutment shape 512b of the cover 512 is separately disposed at the sensor mounting portion 51 of the flexible printed wiring board 518 and the bending portion 52 of the flexible printed wiring board 518 when the base member 504 is viewed from the optical axis direction (the vertical direction in FIGS. 9A and 9B). In such a case, the image stabilization group 501 will become large within the plane substantially perpendicular to the optical axis direction in the same manner as the conventional optical image stabilization unit. However, in the preferred embodiment of the present invention, when the base member 504 is viewed from the optical axis direction (the vertical direction in FIGS. 9A and 9B), the sensor mounting portion 51 of the flexible printed wiring board 518 and the bending portion 52 of the flexible printed wiring board 518 are disposed so as to overlap with the abutment shape 512b of the cover 512. Furthermore, the sensor mounting portion 51 of the flexible printed wiring board 518 and the bending portion 52 of the flexible printed wiring board 518 commonly use the positioning pins 505b. In this way, the miniaturization within the plane substantially perpendicular to the optical axis direction of the image stabilization group 501 is realized.

As described above, the image stabilization group 501 includes the flexible printed wiring board 518 that has the excellent durability and is positioned with high accuracy, and the miniaturization within the plane perpendicular to the optical axis direction of the image stabilization group 501 is realized.

Figure 10:
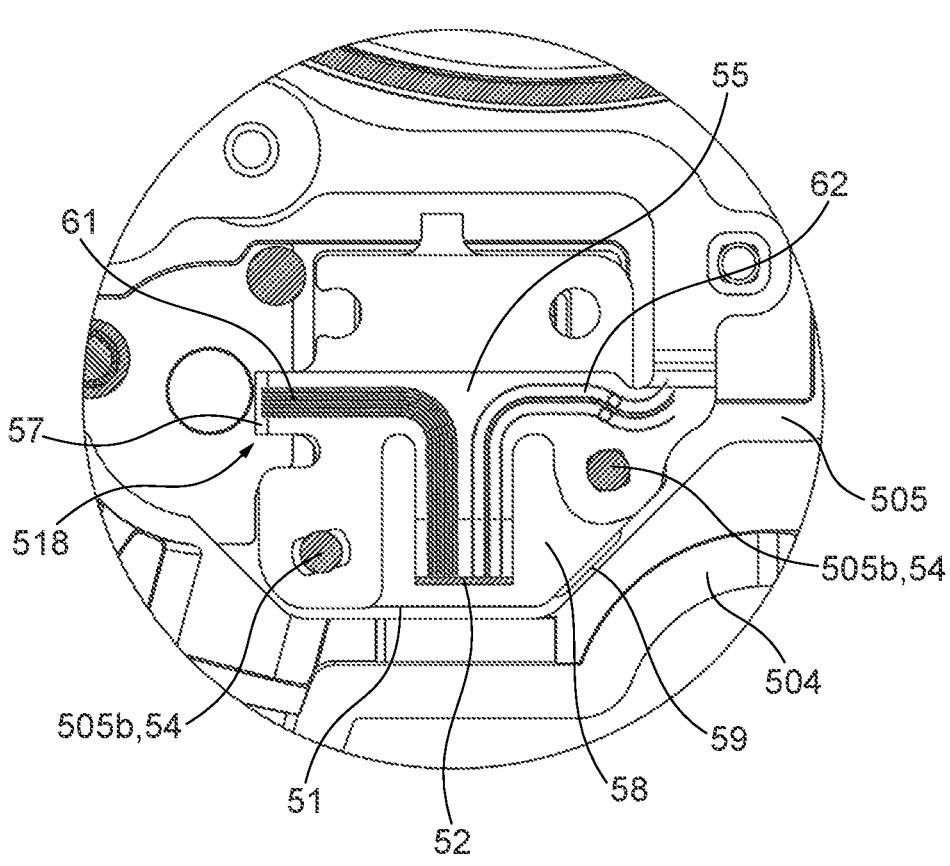
FIG. 10 is a view that shows a wiring pattern of a conductor layer of a flexible printed wiring board of the image stabilization group.

Next, the wiring of the flexible printed wiring board 518 will be described. FIG. 10 is a view that shows a wiring pattern of a conductor layer of the flexible printed wiring board 518. As shown in FIG. 10, the wiring within the movable side holding portion 55 of the flexible printed wiring board 518 is roughly classified into a first wiring pattern 61 and a second wiring pattern 62. The first wiring pattern 61 is a wiring pattern, through which detection signals are transmitted, and is electrically connected to the position detection sensor 517 held by the lens holding member 505 on the surface opposite to the holding surface 58 of the sensor mounting portion 51. On the other hand, the second wiring pattern 62 is a wiring pattern, through which drive signals are transmitted, and is electrically connected to the coils 513 for driving the lens holding member 505 in the lens holding member 505. The two wirings of the first wiring pattern 61 and the second wiring pattern 62 are arranged side by side within the bending portion 52 of the flexible printed wiring board 518, and are arranged in opposite directions as they move from the base portion of the bending portion 52 into the movable side holding portion 55. As a result, in the movable side holding portion 55 of the flexible printed wiring board 518, the detection signal of the position detection sensor 517 transmitted by the first wiring pattern 61 will not be affected by noises caused by the drive signal or the like transmitted by the second wiring pattern 62.

In general, the detection signal is susceptible to external noises. Therefore, it is desirable that the first wiring pattern 61, through which the detection signal is transmitted, has a distance from an adjacent wiring, especially the second wiring pattern 62, through which the drive signal is transmitted, so as to avoid the influence of noises. In this regard, in the sensor mounting portion 51 of the flexible printed wiring board 518, on the surface opposite to the holding surface 58 of the sensor mounting portion 51, the second wiring pattern 62, through which the drive signal is transmitted, does not exist, and only the first wiring pattern 61, through which the detection signal is transmitted, exists. As a result, in the sensor mounting portion 51 of the flexible printed wiring board 518, the detection signal of the position detection sensor 517 transmitted by the first wiring pattern 61 will not be affected by the noises caused by the drive signal or the like transmitted by the second wiring pattern 62. Furthermore, it becomes possible to achieve space saving of the sensor mounting portion 51.

In addition, a portion of the flexible printed wiring board 518 where only the first wiring pattern 61 is arranged is folded by the bent portion 57 so that it is overlapped with the sensor mounting portion 51 sandwiched therebetween. With respect to such an overlap, the thickness of the reinforcing plate 59 stuck on the sensor mounting portion 51 and the thickness of the reinforcing plate 60 stuck on the movable side holding portion 55 ensure a distance to the flexible printed wiring board 518 overlapped with the sensor mounting portion 51 sandwiched therebetween. As a result, the influence of noises on the detection signal can be reduced.

As described above, in the image stabilization group 501, in the first wiring pattern 61 and the second wiring pattern 62 of the flexible printed wiring board 518, noise interference between wirings and noise interference to electrical components such as the position detection sensor 517 are suppressed. As a result, in the image stabilization group 501, the reliability of the electrical connection is enhanced. Furthermore, in the image stabilization group 501, since the space efficiency for arranging the signal wiring and the electrical components is enhanced, it is possible to realize further miniaturization within the plane substantially perpendicular to the optical axis direction of the image stabilization group 501.

Although the preferred embodiment of the present invention has been described above, the present invention is not limited to the above-described preferred embodiment, and various modifications and changes are possible within the scope of the gist thereof.

For example, in the preferred embodiment of the present invention, although the pair of positioning pins 505b are provided in the lens holding member 505, three or more positioning pins 505b may be provided. In addition, although the pair of positioning pins 512a are provided in the cover 512, three or more positioning pins 512a may be provided.

In addition, in the preferred embodiment of the present invention, as an example of the optical image stabilization unit, although the image stabilization group 501 included in the lens barrel 101 of the digital camera 1 has been described, the optical image stabilization unit is not limited to the image stabilization group. Other examples of the optical image stabilization unit include those mounted on digital video cameras, cameras with integrated lenses, binoculars, telescopes, field scopes, tablet terminals, smartphones, and the like. Therefore, in addition to the digital camera 1 described in the preferred embodiment of the present invention, examples of the optical apparatus include digital video cameras, cameras with integrated lenses, binoculars, telescopes, field scopes, tablet terminals, smartphones, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-120684, filed on Jul. 28, 2022, which is hereby incorporated by reference herein in its entirety.

What is claimed is:

1. An optical image stabilization unit comprising:
   a fixed member;
   a lens;
   a movable member that holds the lens and is movable on a plane, which is substantially perpendicular to an optical axis direction, in the fixed member;
   a position detection sensor that is held by the movable member; and
   a flexible printed wiring board,
   wherein the flexible printed wiring board comprises
      a fixed side holding portion that is fixed to the fixed member;
      a movable side holding portion that is fixed to the movable member;
      a bending portion that connects the fixed side holding portion and the movable side holding portion; and
      a sensor mounting portion, on which the position detection sensor is mounted, and
   when the flexible printed wiring board is viewed from the optical axis direction, the bending portion and the sensor mounting portion are disposed to overlap each other,
   wherein the movable member comprises a plurality of positioning portions, and
   the movable side holding portion and the sensor mounting portion of the flexible printed wiring board are positioned together with the movable member by the plurality of positioning portions,
   wherein the bending portion of the flexible printed wiring board is disposed between the plurality of positioning portions of the movable member, and
   wherein a first spacer, which is interposed between the movable side holding portion and the sensor mounting portion of the flexible printed wiring board, is provided between the plurality of positioning portions of the movable member.

2. The optical image stabilization unit according to claim 1,
   wherein an edge of the first spacer is disposed apart from a base portion of the bending portion of the flexible printed wiring board.

3. The optical image stabilization unit according to claim 1,
   wherein the flexible printed wiring board is folded near an edge end of the sensor mounting portion from a side opposite to the position detection sensor to a side where the position detection sensor is mounted in the sensor mounting portion.

4. The optical image stabilization unit according to claim 1,
   wherein the flexible printed wiring board comprises
      a first wiring pattern arranged within the bending portion, through which a detection signal of the position detection sensor is transmitted; and
      a second wiring pattern arranged side by side with the first wiring pattern within the bending portion, through which a drive signal of the movable member is transmitted, and
   the first wiring pattern and the second wiring pattern are arranged separately at the movable side holding portion.

5. The optical image stabilization unit according to claim 4,
   wherein a first spacer, which is interposed between the movable side holding portion and the sensor mounting portion of the flexible printed wiring board, is provided.

6. The optical image stabilization unit according to claim 5, wherein an edge of the first spacer is disposed apart from a base portion of the bending portion of the flexible printed wiring board.

7. The optical image stabilization unit according to claim 4, wherein the flexible printed wiring board is folded near an edge end of the sensor mounting portion from a side opposite to the position detection sensor to a side where the position detection sensor is mounted in the sensor mounting portion.

8. The optical image stabilization unit according to claim 4, wherein a second spacer, which is interposed between the sensor mounting portion and the movable member of the flexible printed wiring board, is provided.

9. The optical image stabilization unit according to claim 1, wherein the fixed member includes an abutment shape, and the abutment shape of the fixed member has a curvature indicating that the abutment shape protrudes toward the bending portion of the flexible printed wiring board.

10. The optical image stabilization unit according to claim 9, wherein, when the fixed member is viewed from the optical axis direction, the abutment shape is disposed to overlap the bending portion and the sensor mounting portion of the flexible printed wiring board.

11. The optical image stabilization unit according to claim 9, wherein, when the fixed member is viewed from the optical axis direction, a circumferential direction center of the abutment shape coincides with a width direction center of the bending portion of the flexible printed wiring board.

12. A lens barrel comprising:

an optical image stabilization unit, comprising:
 a fixed member;
 a lens;
 a movable member that holds the lens and is movable on a plane, which is substantially perpendicular to an optical axis direction, in the fixed member;
 a position detection sensor that is held by the movable member; and
 a flexible printed wiring board,
wherein the flexible printed wiring board comprises
 a fixed side holding portion that is fixed to the fixed member;
 a movable side holding portion that is fixed to the movable member;
 a bending portion that connects the fixed side holding portion and the movable side holding portion; and
 a sensor mounting portion, on which the position detection sensor is mounted, and when the flexible printed wiring board is viewed from the optical axis direction, the bending portion and the sensor mounting portion are disposed to overlap each other,
wherein the movable member comprises a plurality of positioning portions, and
the movable side holding portion and the sensor mounting portion of the flexible printed wiring board are positioned together with the movable member by the plurality of positioning portions,
wherein the bending portion of the flexible printed wiring board is disposed between the plurality of positioning portions of the movable member, and
wherein a first spacer, which is interposed between the movable side holding portion and the sensor mounting portion of the flexible printed wiring board, is provided between the plurality of positioning portions of the movable member.

13. An optical apparatus comprising:
an optical image stabilization unit, comprising:
 a fixed member;
 a lens;
 a movable member that holds the lens and is movable on a plane, which is substantially perpendicular to an optical axis direction, in the fixed member;
 a position detection sensor that is held by the movable member; and
 a flexible printed wiring board,
wherein the flexible printed wiring board comprises
 a fixed side holding portion that is fixed to the fixed member;
 a movable side holding portion that is fixed to the movable member;
 a bending portion that connects the fixed side holding portion and the movable side holding portion; and
 a sensor mounting portion, on which the position detection sensor is mounted, and
when the flexible printed wiring board is viewed from the optical axis direction, the bending portion and the sensor mounting portion are disposed to overlap each other,
wherein the movable member comprises a plurality of positioning portions, and
the movable side holding portion and the sensor mounting portion of the flexible printed wiring board are positioned together with the movable member by the plurality of positioning portions,
wherein the bending portion of the flexible printed wiring board is disposed between the plurality of positioning portions of the movable member, and
wherein a first spacer, which is interposed between the movable side holding portion and the sensor mounting portion of the flexible printed wiring board, is provided between the plurality of positioning portions of the movable member.

* * * * *